United States Patent [19]

Miyazaki

[11] Patent Number: 5,003,413
[45] Date of Patent: Mar. 26, 1991

[54] TRACKING CONTROL CIRCUIT OF HELICAL SCANNING MAGNETIC TAPE APPARATUS

[75] Inventor: Hideto Miyazaki, Sanda, Japan
[73] Assignee: Mitsubishi Denki Kabushiki Kaisha, Tokyo, Japan
[21] Appl. No.: 401,229
[22] Filed: Aug. 31, 1989
[30] Foreign Application Priority Data
  Sep. 5, 1988 [JP] Japan .................. 63-221911
[51] Int. Cl.$^5$ .............................................. G11B 5/588
[52] U.S. Cl. ..................... 360/77.14; 360/70; 358/315
[58] Field of Search ............. 360/77.13, 77.14, 77.15, 360/70, 33.1; 358/315, 340

[56] References Cited
U.S. PATENT DOCUMENTS
4,616,353 10/1986 Kaneda et al. ................ 369/43
4,658,309 4/1987 Yasuda et al. ................ 360/77.14

FOREIGN PATENT DOCUMENTS
60-138753 7/1985 Japan .................. 360/77.15
60-209952 10/1985 Japan .................. 360/77.15
62-214543 9/1987 Japan .................. 360/77.14

Primary Examiner—Aristotelis M. Psitos
Assistant Examiner—David L. Robertson
Attorney, Agent, or Firm—Burns, Doane, Swecker & Mathis

[57] ABSTRACT

In a digital audio magnetic tape reproducing apparatus of herical scanning using two magnetic heads, a first head reproduces a pilot signal of its own track and two pilot signals of both neighboring tracks of its own track by affection of crosstalk, then a difference value between the values of the reproduced signals of the two pilot signals is calculated and is applied to a tracking servo system as a tracking error signal, moreover, the difference value is controlled by a reproduced signals of a pilot signal reproduced by a second magnetic head in the previous reproducing period.

4 Claims, 17 Drawing Sheets

FIG.10 (General Art)
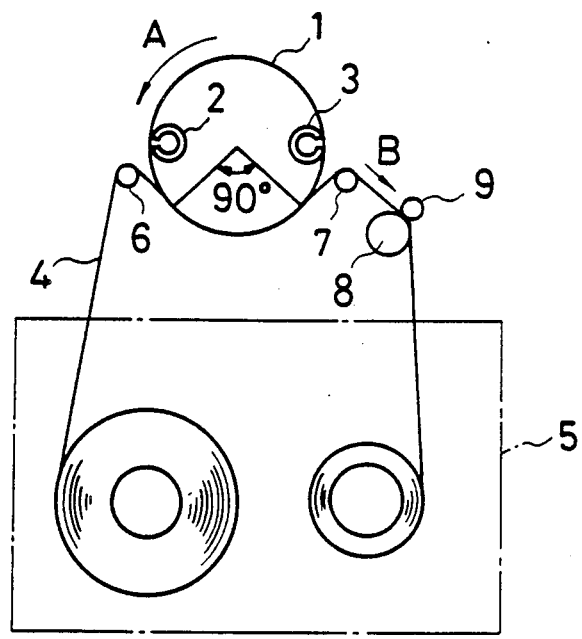
FIG.11 (General Art)
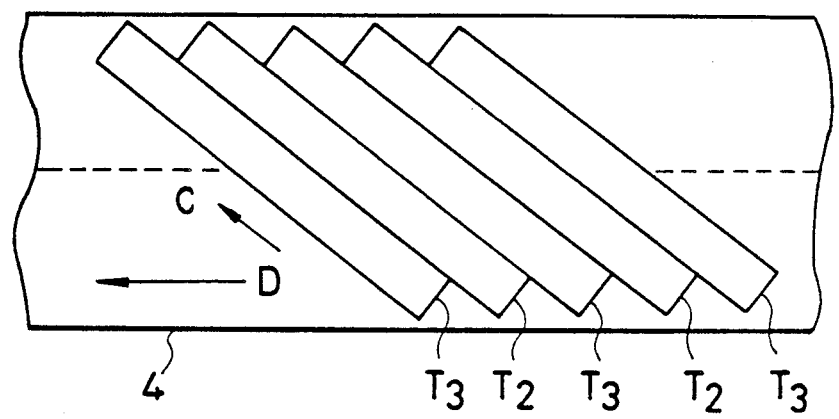

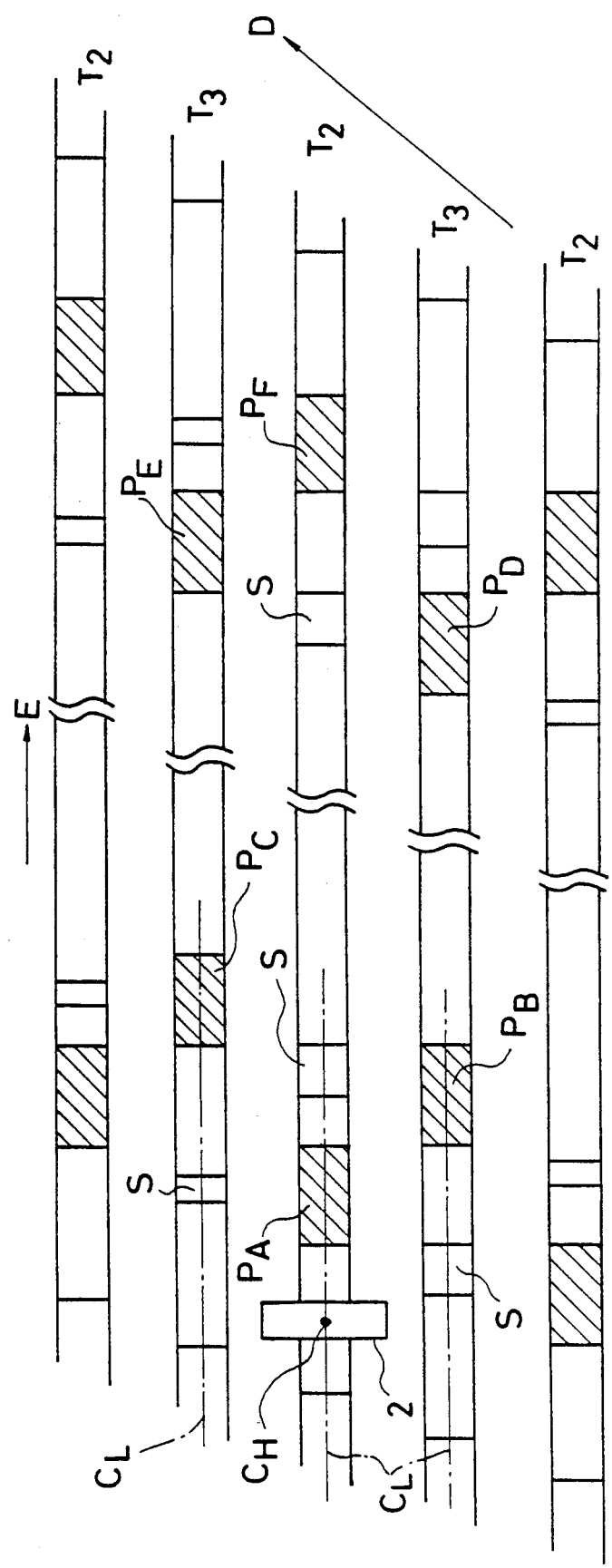
FIG.12 (General Art)

FIG.13(a)(General Art)
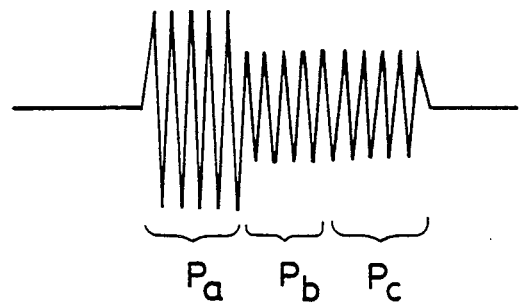
FIG.13(b)(General Art)
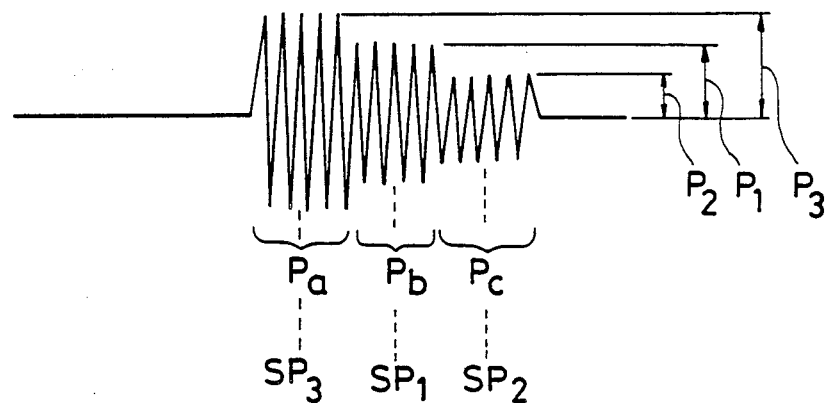
FIG.13(c)(General Art)
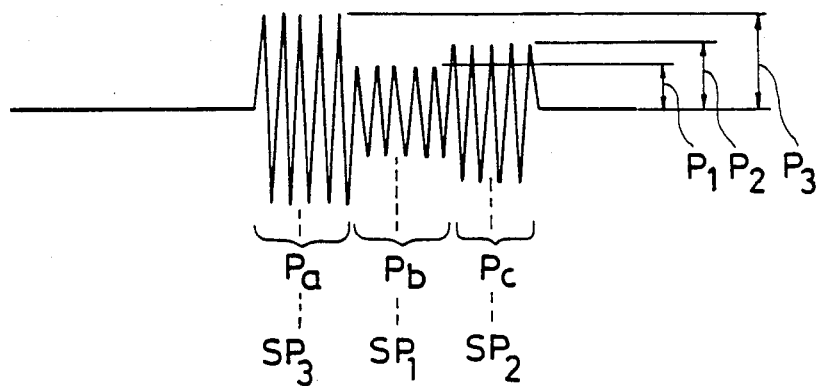

FIG.14 (General Art)
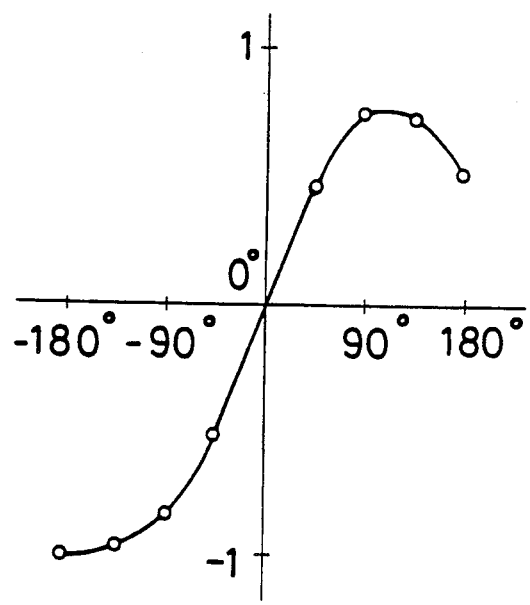

FIG.18 (a) (General Art)
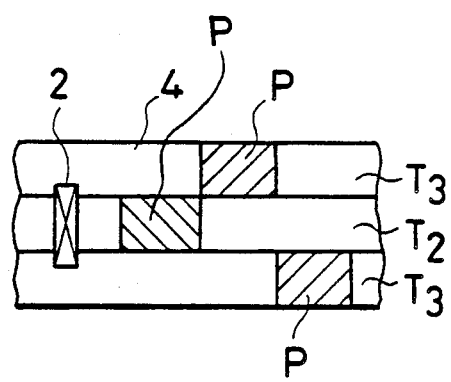
FIG.18 (b) (General Art)
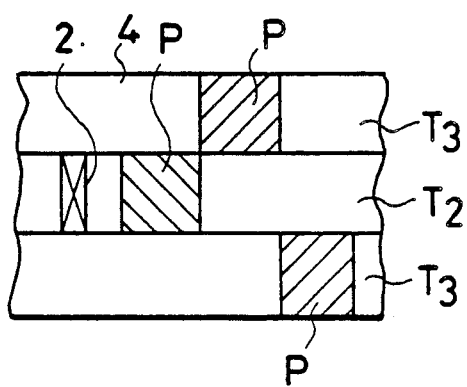

TRACKING CONTROL CIRCUIT OF HELICAL SCANNING MAGNETIC TAPE APPARATUS

FIELD OF THE INVENTION AND RELATED ART STATEMENT

1. Filed of the Invention

The present invention relates generally to a tracking control circuit of a magnetic tape reproducing apparatus having a rotary head for helical scanning, and more particularly to a tracking control circuit in a digital audio tape reproducing apparatus having the rotary head for helical scanning.

2. Description of the Related Art

Recently, A digital recording and reproducing system utilizing a pulse code modulation technology have been introduced into an audio apparatus in order to improve high-fidelity characteristic in reproduction of music or sound.

A digital audio tape recorder, one of the digital audio apparatus, comprises plural magnetic heads mounted on a rotary member placed in a rotary cylinder on which a magnetic tape is wound and is transported thereby, and the magnetic heads run on the magnetic tape in the direction which is oblique with respect to the direction along the length of the magnetic tape.

FIG. 10 is a plan view of an example of a conventional magnetic tape transporting mechanism. A rotary cylinder 1 rotates in the direction of arrow A. The magnetic tape 4 which is drawn from a cassette 5 is wound around the peripheral region of about 90° of central angle of the rotary cylinder 1 by mean of two guide pins 6 and 7, and is transported in the direction of arrow B by a driving capstan 9 and a pinch roller 8. Two magnetic heads 2 and 3 mounted on a rotary head holder (not shown) are arranged at the periphery of the rotary cylinder 1 so that each head tip slightly protrudes from the peripheral surface of the cylinder 1.

FIG. 11 is a plan view of the magnetic tape 4 showing recorded tracks. The tracks are inclined, as shown by an arrow C, relative to the transporting direction D of the magnetic tape 4. Referring to FIG. 11, tracks $T_2$ are formed by the magnetic head 2 and tracks $T_3$ are formed by the magnetic head 3.

In the conventional reproducing process of the magnetic tape 4, it is required that the magnetic head 2 accurately traces the tracks $T_2$ and the magnetic head 3 also accurately traces the tracks $T_3$. In order to realize the accurate tracing of the magnetic heads 2 and 3, tracking servo means is provided in the transporting device of the magnetic tape 4.

An automatic track finding method (abbreviated in general as ATF) is employed for the tracking servo means.

In the ATF method, when a digitalized signal is recorded on the track, a predetermined ATF signal is recorded on a start region and an end region of each track. Allocation of the ATF signal in the normal track mode is illustrated by FIG. 12. The ATF signal composed of a pilot signal P and a synchronizing signal S which are lower than the digitalized signal of data in frequency. The allocation pattern of the ATF signal is standardized and is repeated every four tracks on the magnetic tape 4.

Referring to FIG. 12 and FIGS. 13(a), 13(b) and 13(c), the magnetic head 2 traces the track $T_2$ in the direction of arrow E and detects early pilot signals $P_A$, $P_B$ and $P_C$ and the synchronizing signal S. A signal as shown by FIG. 13(a), FIG. 13(b) or FIG. 13(c) is obtained by amplifying the detected signal of the pilot signal $P_A$, $P_B$ or $P_C$ with an amplifier and then passing it through a low-pass filter.

When the magnetic head 2 accurately traces the track $T_2$, a signal shown by FIG. 13(a) is output. Referring to FIG. 13(a), the wave form $P_a$ shows the detected signal of the pilot signal $P_A$, and the waveforms $P_b$ and $P_c$ show the crosstalks of the pilot signals $P_B$ and $P_C$, respectively. Since the center $C_H$ of the magnetic head 2 is on the center line $C_L$ of the track $T_2$, the output level $P_1$ of the wave form $P_b$ is equal to that of the wave form $P_c$.

On the other hand, when the center $C_H$ of the magnetic head 2 deviates from the center line $C_L$ of the track $T_2$ and is deflected downward, the level of the wave form $P_b$ is higher than that of the wave form $P_c$ as shown in FIG. 13(b), because the area of the magnetic head 2 which covers the pilot signal $P_B$ is larger than that which covers the pilot signal $P_C$.

On the contrary, when the center $C_H$ of the magnetic head 2 is deflected upward, as shown in FIG. 13(c), the level $P_1$ of the wave form $P_b$ is lower than the level $P_2$ of the wave form $P_c$ in a similar manner. A difference between the levels $P_1$ and $P_2$ represents a deflected value of the magnetic head from the track $T_2$, and a tracking error signal corresponding to the deflected value is obtained.

FIG. 14 represents a level of a tracking error signal versus the deflected value represented by angle. Referring to FIG. 14, when the center $C_H$ of the head 2 is on the center ling $C_L$ of the track $T_2$, a deflected angle of the abscissa is zero degree. On the other hand, when the center CH of the head 2 is on a center line of a neighboring track $T_3$, the deflected angle is $+180°$ or $-180°$. Then, the ordinate designates the level of the tracking error signal corresponding to the difference between the levels $P_1$ and $P_2$.

In a similar manner, a tracking error signal of the track $T_3$ which is traced by the magnetic head 3 is produced.

The levels $P_1$ or $P_2$ of the pilot signals $P_B$ and $P_C$ are detected in synchronism with synchronizing signals $SP_1$ and $SP_2$, respectively. The synchronizing signals $SP_1$ and $SP_2$ are created on the basis of the synchronizing signal S of the ATF signal.

FIG. 15 is a block diagram of a tracking control circuit for creating the tracking error signal in the prior art. The detected signal of the magnetic head 2 or 3 is amplified by an amplifier 11 and is applied to a low-pass filter 15. The higher frequency component including digitalized signal of data and the synchronizing signal S is eliminated by the low-pass filter 15. Then the output signal of the low-pass filter 15 is applied to an envelope detecting circuit 16, and envelopes of the pilot signals $P_A$, $P_B$ and $P_C$ are detected.

On the other hand, the amplified synchronizing signal S is separated from other signals by a band-pass filter 12, and then the zero level of the synchronizing signal S is detected by a zero-cross comparator 13. A synchronizing signal generator 14 generates the synchronizing signals $SP_1$ and $SP_2$ on the basis of the output of the zero cross comparator 13. The synchronizing signal $SP_1$ is applied to a sample-hold circuit 17 and the level $P_1$ of the pilot signal $P_B$ is detected. Then the value of the level $P_2$ is subtracted from the value of the level $P_1$ at an adder 18, and a resultant value is held by a sample-hold circuit 19 in synchronism with the synchronizing signal SP$_2$. The resultant value is the value of the tracking error signal. The tracking error signal is applied to a tracking servo means which is generally understood to one with ordinary skill in the art and therefore is omitted in the description.

In the foregoing conventional tracking control circuit, however, a characteristic of the level of the tracking error signal seriously deviates from a normal characteristic shown by a solid line L$_2$ in FIG. 16 due to unbalance between sensitivities of the respective magnetic heads 2 and 3 or variation of characteristic of a magnetic tape. Various deviated characteristics of the level of the tracking error signal are represented by a dashed line L$_1$ or an alternate long and short dash line L$_3$. Consequently, a tracking servo loop gain must be varied to meet the deviation, and hence stable servo operation can not be maintained.

A prior art of the tracking control circuit for improving the above-mentioned difficulty is disclosed in the Japanese published unexamined patent application Sho 62-214543 as shown in FIG. 17. Referring to FIG. 17, an automatic gain control circuit 21 (hereinafter abbreviated as AGC circuit) is provided between the amplifier 11 and the low pass filter 15. Moreover, an adder 22 for calculating a sum of the levels P$_1$, P$_2$ and P$_3$ in synchronism with the synchronizing signals SP$_1$, SP$_2$ and SP$_3$ is provided, and the output signal of the adder 22 is applied to the AGC circuit 21. The synchronizing signal SP$_3$ is created on the basis of the reproduced signal of a synchronizing signal S of a neighboring tack. The gain of the AGC circuit 21 is controlled by the output signal of the adder 22, and fluctuation of the output of the magnetic heads 2 and 3 is compensated the characteristic of the level of the tracking error signal shown by the solid line L$_2$ of FIG. 16 can be maintained.

In digital audio tape recording and reproducing system using a tape cassette, the normal track mode as shown in FIG. 18($a$) and the wide track mode as shown in FIG. 18($b$) are standardized. The normal track mode is applicable to recording and reproducing by a consumer. On the other hand, the wide track mode is applied to make prerecorded tapes which are recorded in factory.

In the above-mentioned prior art as shown in FIG. 17, it is required that the output levels of the magnetic heads 2 and 3 reproducing the pilot signals P$_A$, P$_B$ and P$_C$ are constant within a range of deflected angle (from +120° to −120°, for example). However, when the magnetic tape recorded by the wide track mode is reproduced by a magnetic tape reproducing apparatus having a characteristic of the level of the tracking error signal which is preferable to the normal track mode as shown by a dotted line L$_5$ of FIG. 19 which is slightly different from an ideal characteristic represented by a solid ling L$_4$, the characteristic of the level of the tracking error signal seriously changes as shown by a dotted line L$_7$ of FIG. 20 which is different from the ideal characteristics of the level of the tracking error signal L$_6$. Hence, stable servo operation cannot be maintained, and compatibility between the normal track mode and the wide track mode cannot be attained. Furthermore, it is premise that the sensitivity of each magnetic head is identical with each other. When the sensitivity of each magnetic head is different from each other, stable tracking servo operation cannot be maintained.

OBJECT AND SUMMARY OF THE INVENTION

An object of the present invention is to provide a tracking control circuit in which stable tracking servo operation is maintained.

The tracking control circuit of the helical scanning magnetic tape apparatus in accordance with the present invention comprises:

at least one magnetic head for reproducing recorded signals of a magnetic tape including pilot signals and a synchronizing signal, first filter means for passing the reproduced signal of the pilot signals, envelope detecting means for detecting envelope of the reproduced signal of the pilot signal, second filter means for passing the reproduced signal of the synchronizing signal, a synchronizing signal generator for creating timing signals on the basis of the reproduced signal of the synchronizing signal, calculating means for calculating a level of difference between the respective levels of the reproduced signals by affection of crosstalk of respective pilot signals recorded on both neighboring tracks of a track, a sample hold circuit for holding the level of difference between the respective levels of the two reproduced signals of the pilot signals in synchronism with the timing signal, a delay circuit for delaying the reproduced signal of the pilot signal of the track, an automatic gain control circuit for controlling the level of difference on the basis of the delayed reproduced signal of the pilot signal of the previous track.

According to the present invention, respective pilot signals of both neighboring tracks of the present reproducing track of a magnetic head are detected by affection of crosstalk, and a tracking error signal is created on the basis of a difference between the level of the detected respective pilot signals. Then the level of the tracking error signal is controlled by a signal including a pilot signal which is detected in reproducing step of other track.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 10 is a plan view of an example of a magnetic tape transporting mechanism in which the tracking control circuit is applied;

FIG. 11 is a plan view of a magnetic tape showing recorded tracks in herical scanning;

FIG. 12 is a plan view of the recorded tracks showing allocation of ATF signal in the normal track mode;

FIGS. 13(a), 13(b) and 13(c) are waveforms of an output signal of a magnetic head reproducing the ATF signals;

FIG. 14 is a graph of characteristic of level of tracking error signal;

FIGS. 18(a) and 18(b) are figures of ATF signal allocation in the normal track mode and the wide track mode, respectively;

DESCRIPTION OF THE PREFERRED EMBODIMENTS

Figure 1:
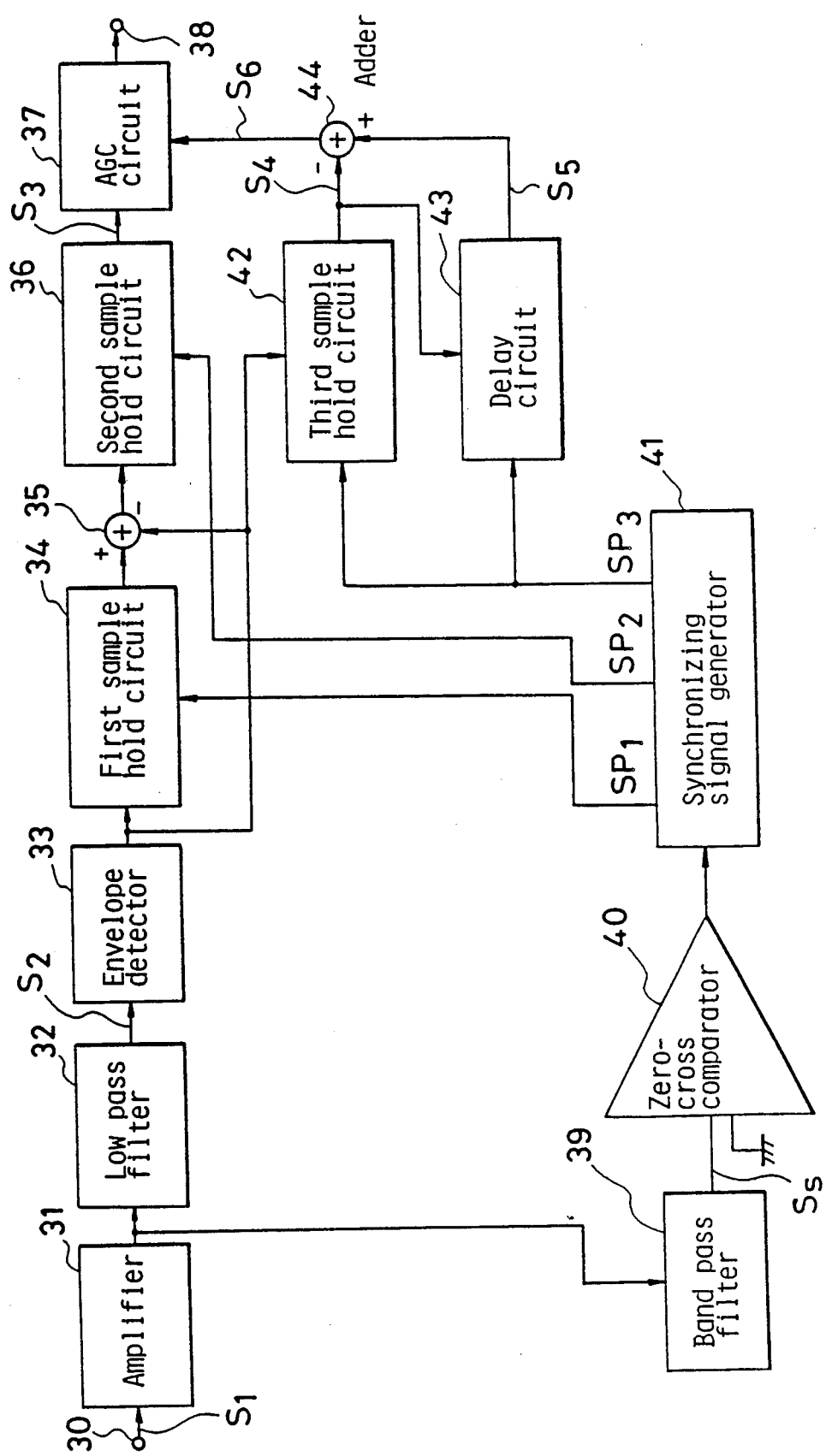
FIG. 1 is a circuit block diagram of a first embodiment of the tracking control circuit in accordance with the present invention.

FIG. 1 is a circuit block diagram of a first embodiment of a tracking control circuit in accordance with the present invention. Two magnetic heads 2 and 3 in a magnetic tape transporting mechanism shown in FIG. 10 scan a magnetic tape 4. The magnetic head 2 or 3 moves in the direction of arrow E on the magnetic tape 4 which is transported in the direction of arrow D as shown in FIG. 12.

A reproduced signal $S_1$ of the magnetic heads 2 and 3 are inputted into an amplifier 31 through an input terminal 30. The reproduced signal $S_1$ is composed of both the output signals of the magnetic heads 2 and 3 which are connected into one signal in a time sequence.

Figure 2:
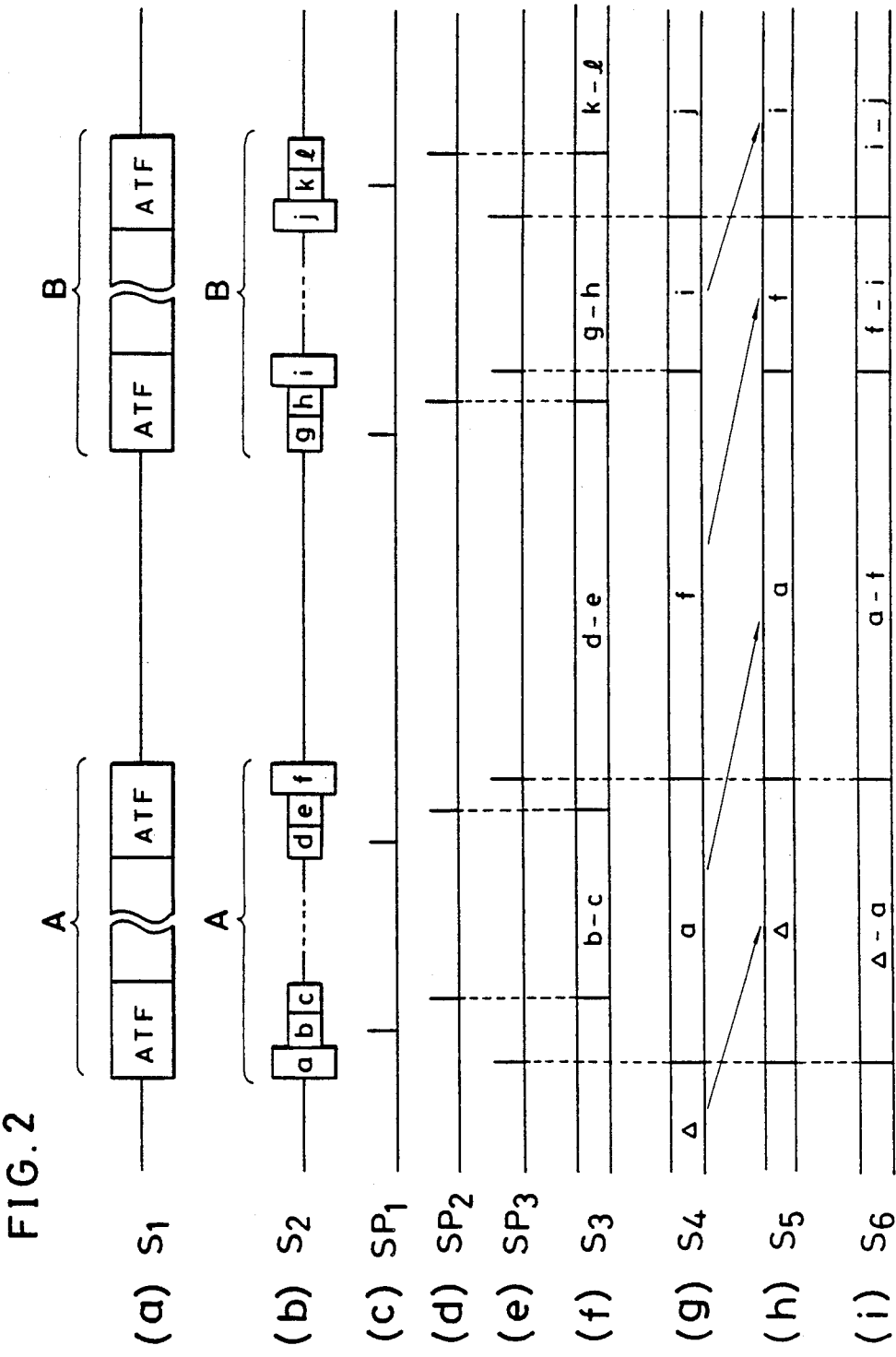
FIGS. 2($a$), 2($b$), 2($c$), 2($d$), 2($e$), 2($f$), 2($g$) 2($h$) and 2($i$) are timing charts in operation of the first embodiment.

FIG. 2(a) shows the reproduced signal $S_1$. A signal A is reproduced by the magnetic head 2 and a signal B is reproduced by the magnetic head 3. The output of the amplifier 31 is applied to a low-pass filter 32 and a band-pass filter 39.

The low-pass filter 32 allows to pass only early pilot signals $P_A$, $P_B$ and $P_C$ and later pilot signals $P_D$, $P_E$ and $P_F$ of the ATF signal as shown in FIG. 12, and digitalized signals of data and a synchronizing signal S of the ATF signal are eliminated.

Referring to FIG. 12, when the magnetic head 2 moves in the direction of arrow E on a central track $T_2$, first, the pilot signal $P_A$ is detected. Second, the pilot signal $P_B$ is detected, and third, the pilot signal $P_C$ is detected. The pilot signals $P_B$ and $P_C$ are detected by effect of crosstalk. A reproduced pilot signal $S_2$ in FIG. 1 is composed of the reproduced signals of the pilot signals $P_A$, $P_B$ and $P_C$, and the waveform thereof is shown in FIG. 13(a), 13(b) or 13(c).

Referring to FIG. 1, the reproduced pilot signal $S_2$ is applied to an envelope detector 33, and an envelope of the reproduced pilot signal $S_2$ is detected.

FIG. 2(b) shows the reproduced pilot signal $S_2$. Referring to FIG. 2(b), letters a, f, i and j designate reproduced pilot signals of own track of each magnetic head 2 or 3. On the other hand, letters b, c, d, e, g, h, k and l designate pilot signals reproduced from the pilot signals of neighboring tracks which are detected by crosstalk. The reproduced pilot signals a, b, c, g, h and i are reproduced by the early pilot signals of tracks, and the reproduced pilot signals d, e, f, j, k and l are reproduced by the later pilot signals of the tracks. The output of the envelope detector 33 is applied to a first sample hold circuit 34, a third sample hold circuit 42 and an adder 35.

The band-pass filter 39 allows to pass only the reproduced synchronizing signal $S_S$ of the synchronizing signal S. The synchronizing signal $S_S$ is applied to a zero-cross comparator 40, and a zero-cross time is detected. The output of the zero-cross comparator 40 is applied to a synchronizing signal generator 41, and synchronizing signals $SP_1$, $SP_2$ and $SP_3$ which serve as timing signals are generated on the basis of the zero-cross time of the synchronizing signal $S_S$.

The synchronizing signal $SP_1$ is generated during the period of reproduction of the pilot signal $P_B$ due to crosstalk as shown in FIG. 2(c) and FIG. 13(a), and is applied to the first sample-hold circuit 34. Thus a level $P_1$ of the reproduced signal of the pilot signal $P_B$ is held in the first sample-hold circuit 34.

The output of the first sample-hold circuit 34 is applied to a positive input of an adder 35. On the other hand, the output of the envelope detector 33 is applied to a negative input of the adder 35. In the adder 35, a difference between the value of the level $P_1$ and the output value of the envelope detector 33 is detected and is held in synchronism with the synchronizing signal $SP_2$ which is supplied from the synchronizing signal generator 41 with a second sample hold circuit 36. The synchronizing signal $SP_2$ is generated during the period of reproduction of the pilot signal $P_C$ as shown in FIG. 2(d) and FIG. 13(a). Consequently, the difference between the value of the level $P_1$ and the value of the level $P_2$ of the reproduced signal of the pilot signal $P_C$ is held in the second sample-hold circuit 36 of FIG. 1.

The difference $(P_1 - P_2)$ is designated by "signal $S_3$", and is applied to an automatic gain control circuit 37 (hereinafter abbreviated as AGC circuit). The level of the signal $S_3$ is controlled at the AGC circuit 37 on the basis of a signal $S_6$ which is elucidated hereinafter.

FIG. 2(f) is a time chart of the signal $S_3$. A representation "b−c" represents the difference $(P_1 - P_2)$ between reproduced signals of the pilot signals $P_B$ and $P_C$, and a representation "d−e" represents the difference $(P_1 - P_2)$ between reproduced signals of the pilot signals $P_D$ and $P_E$, for example.

The output of the envelope detector 33 is also applied to the third sample hold circuit 42 which is controlled by the synchronizing signal $SP_3$. The synchronizing signal $SP_3$ is generated during the period reproducing the pilot signal $P_A$ of own track of the magnetic head 2 as shown in FIG. 2(e) and FIG. 13(a). Consequently, the level of the output signal $S_4$ of the third sample hold circuit 42 is equal to the level $P_3$ of the reproduced signal of the pilot signal $P_A$. Then the signal $S_4$ is applied to a negative input of an adder 44.

The time chart of the signal $S_4$ is shown in FIG. 2(g).

On the other hand, the signal $S_4$ is also applied to a delay circuit 43 which is controlled by the synchronizing signal $SP_3$. The delay circuit 43 causes the signal 4 to delay by a time period between consecutive two reproduced pilot signals. A delayed signal $S_5$, as shown in FIG. 2(h), is output from the delay circuit 43. In the track $T_2$ in FIG. 12, for example, the delay time is equal to a time period between the pilot signals $P_A$ and $P_F$. Moreover, when reproduction is proceeded across the tracks $T_2$ and $T_3$, the delay time is equal to a time period between the pilot signals $P_F$ and $P_B$. The signal $S_5$ is applied to a positive input of the adder 44. Consequently, a difference between the level of the reproduced signal of the pilot signal $P_A$ and the level of the reproduced signal of the pilot signal $P_F$ in the track $T_2$ is obtained. The signal representing the difference between the two values is designated as "$S_6$" in FIG. 2(i). The signal $S_6$ is applied to the AGC circuit 37, and the level of the signal $S_3$ is controlled by the signal $S_6$ and is output from an output terminal 38.

The output of the AGC circuit 37 is a tracking error signal which is applicable to the servo control system in a manner that will be familiar to one skilled in the art.

In operation of the above-mentioned tracking control circuit, as shown in FIG. 2(f), during the time period in which the signal $S_3$ of the tracking error signal is issued on the basis of the difference of representation "g−h", the AGC circuit 37 is controlled by the signal $S_6$ which is issued on the basis of the difference of representation "f−i" shown in FIG. 2(i).

The representation "f−i" represents a difference between a reproduced signal level of the signal "f" of own track of the magnetic head 2 and a reproduced signal level of the signal "i" of own track of the magnetic head 3 as shown in FIGS. 2(b) and 2(i).

According to the first embodiment of the present invention, for example in FIG. 2(a), when a recorded level of the signal A is lower than that of the signal B due to nonuniformity in the recording process of the magnetic tape, the reproduced signal levels of the signals g, h and f are lower than the reproduced signal levels of the signals d, e and i, respectively, and thus the difference "f−i" becomes a negative value. The AGC circuit 37 is made to increase its gain by applying a negative control signal. Thus, the gain of the AGC circuit 37 is increased by applying the negative signal of the difference "f−i", and the output level of the AGC circuit 37 which is represented by the difference "g−h" (tracking error signal) increases.

As mentioned above, according to the first embodiment of the present invention, fluctuation of the level of the tracking error signal due to ununiformity of the recorded level of the respective tracks is prevented, and hence, a preferable tracking error signal is output in both the normal track mode and the wide track mode.

Figure 3:
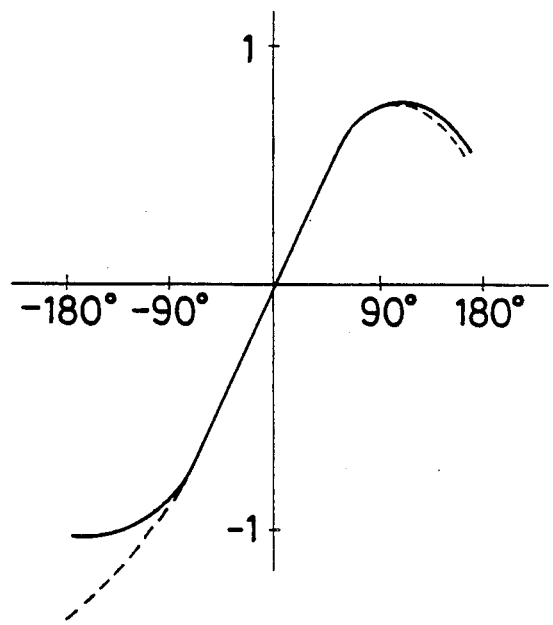
FIG. 3 and FIG. 4 are graphs of characteristic of level of tracking error signal.
Figure 4:
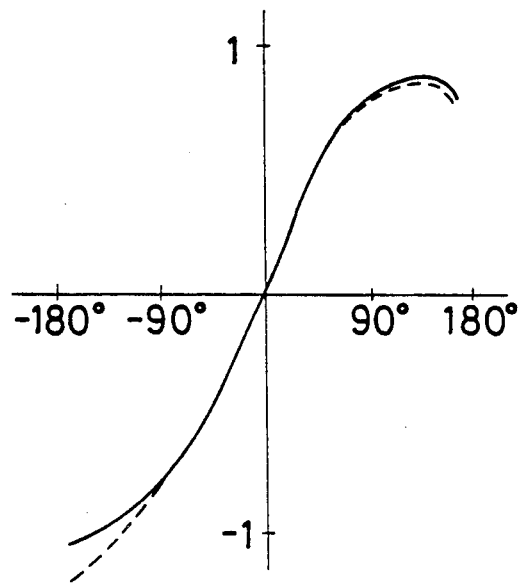

As shown in FIG. 3 (normal track mode) or FIG. 4 (wide track mode), the improved characteristic of level of the tracking error signal in dotted line meets an ideal characteristic in solid line in the range of deflected angle from +120° to −120°. Thus, stable servo control is realized without requiring any change of the gain of the tracking servo system.

Figure 5:
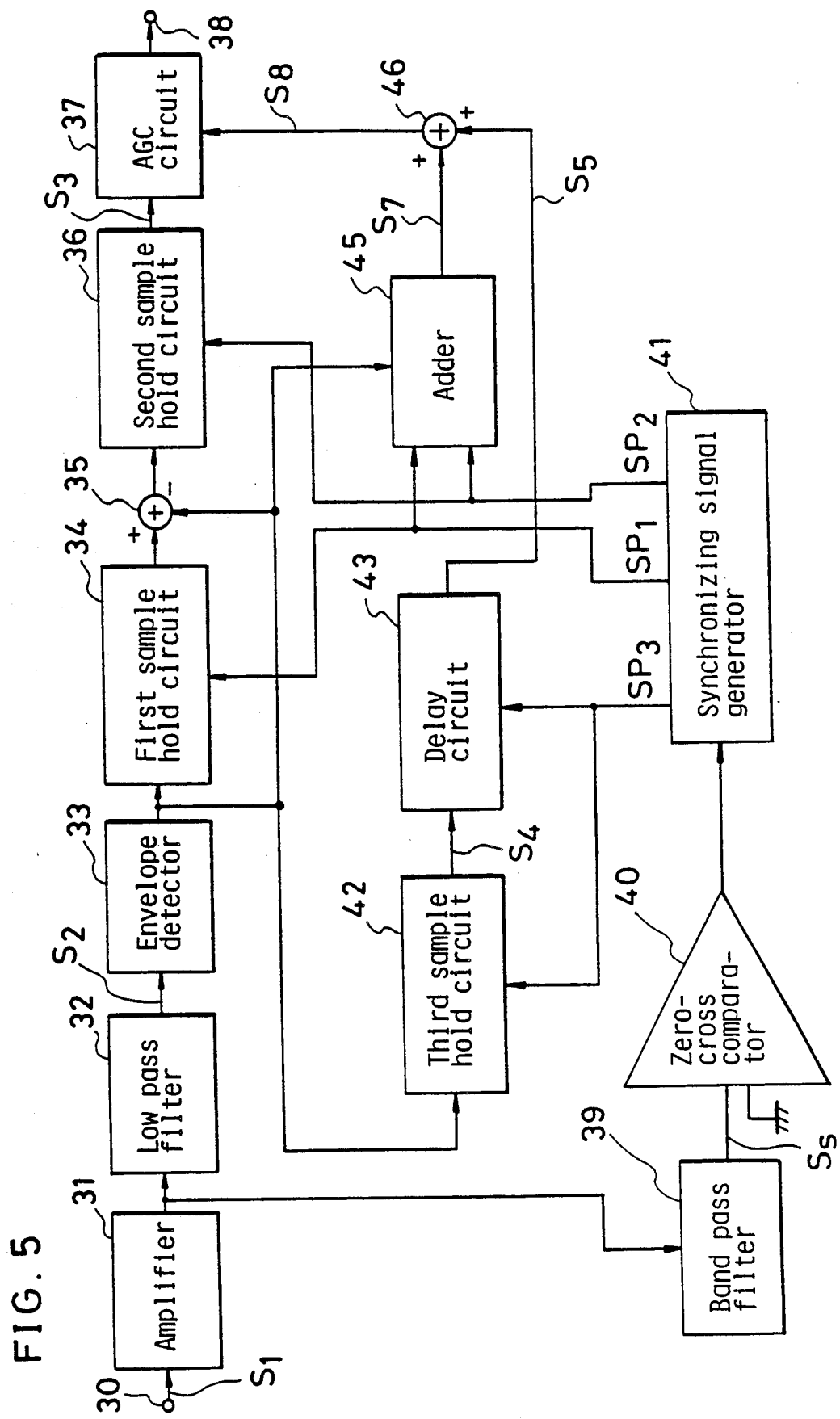
FIG. 5 is a circuit block diagram of a second embodiment of the tracking control circuit in accordance with the present invention.

FIG. 5 is a circuit block diagram of a second embodiment of the present invention.

Referring to FIG. 5, arrangement and operation of the respective circuits with the exception of adders 45 and 46 are identical with that of the first embodiment.

The output of the envelope detector 33 is inputted into the adder 45 which is controlled by the synchronizing signals $SP_1$ and $SP_2$. The output of the adder 45 is applied to the positive input of the adder 46, and the output of the delay circuit 43 is applied to the other positive input thereof. The output of the adder 46 is applied to the AGC circuit 37.

Figure 6:
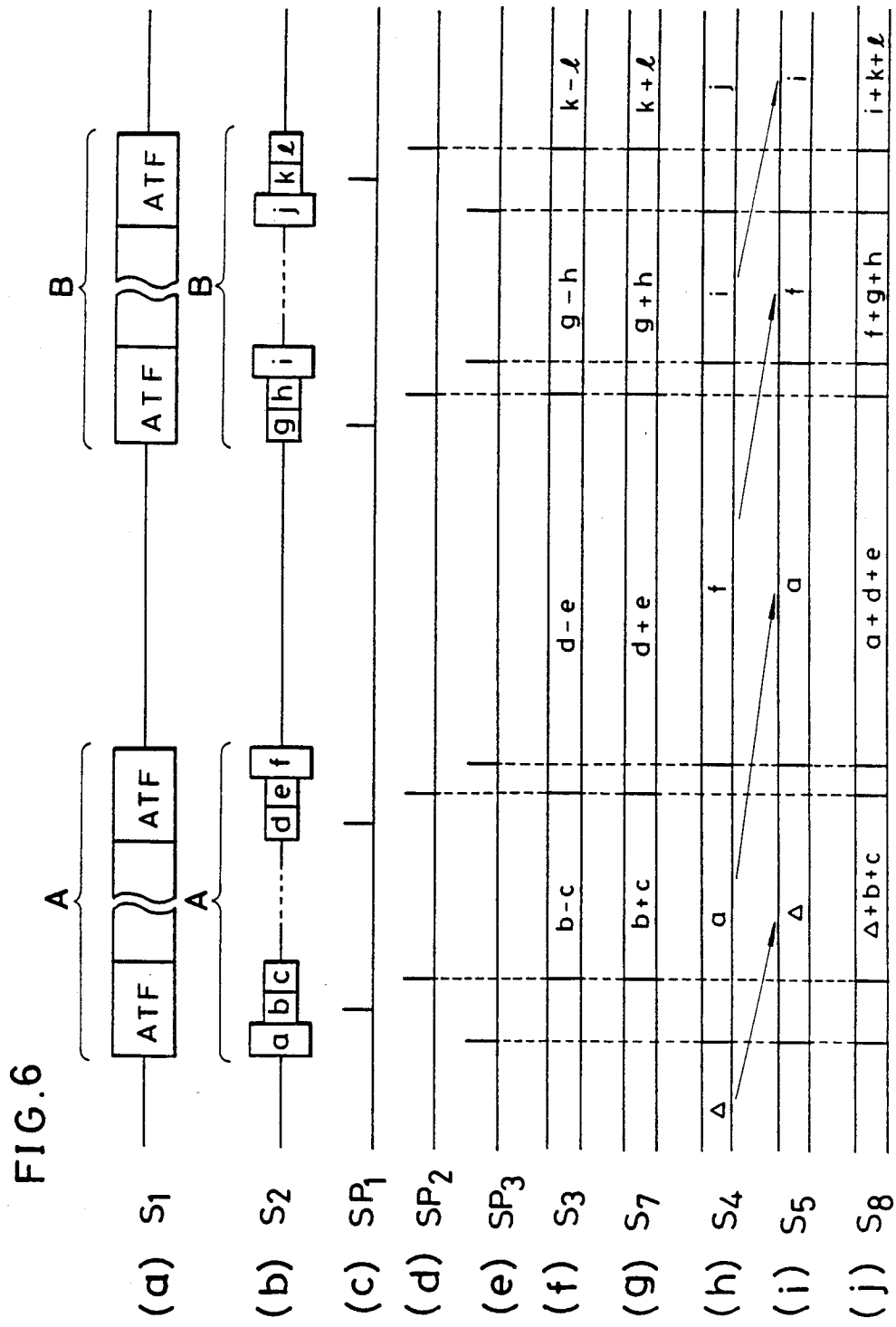
FIGS. 6($a$), 6($b$), 6($c$), 6($d$), 6($e$), 6($f$), 6($g$), 6($h$), 6($i$) and 6($j$) are timing charts in operation of the second embodiment.

The adder 45 holds the output of the envelope detector 33 in synchronism with the synchronizing signals $SP_1$ and $SP_2$, and calculates a sum of levels $P_1$ and $P_2$. Then a signal $S_7$ having the level of the sum is created as shown in FIG. 6(g). The signal $S_7$ is added to the signal $S_5$ of the output of the delay circuit 43 with the adder 46, and a resultant signal $S_8$ is created as shown in FIG. 6(j). The signal $S_8$ is applied to the AGC circuit 37 to be controlled the gain.

According to the second embodiment, the tracking error signal $S_3$ is controlled by a sum of the level of the reproduced signal of the later pilot signal of a track detected during previous reproducing period, and the levels of the signals of the early pilot signals of both neighboring tracks of the next successive track which is presently in reproduction.

Namely, the tracking error signal $S_3$ represented by the difference "g−h" is controlled on the basis of the signal $S_8$ represented by the sum "f+g+h". The AGC circuit 37 in this embodiment is made to vary its gain in inverse proportion to a level of a control signal applied thereto. Therefore the level of the tracking error signal $S_3$ is inversely proportional to the level of the sum "f+g+h". For example, when the recorded level of the signal A is lower than that of the signal B, the level of the sum "f+g+h" is lowered. Consequently, the gain of the AGC circuit 37 increases, and the level of the tracking error signal $S_3$ increases.

Figure 7:
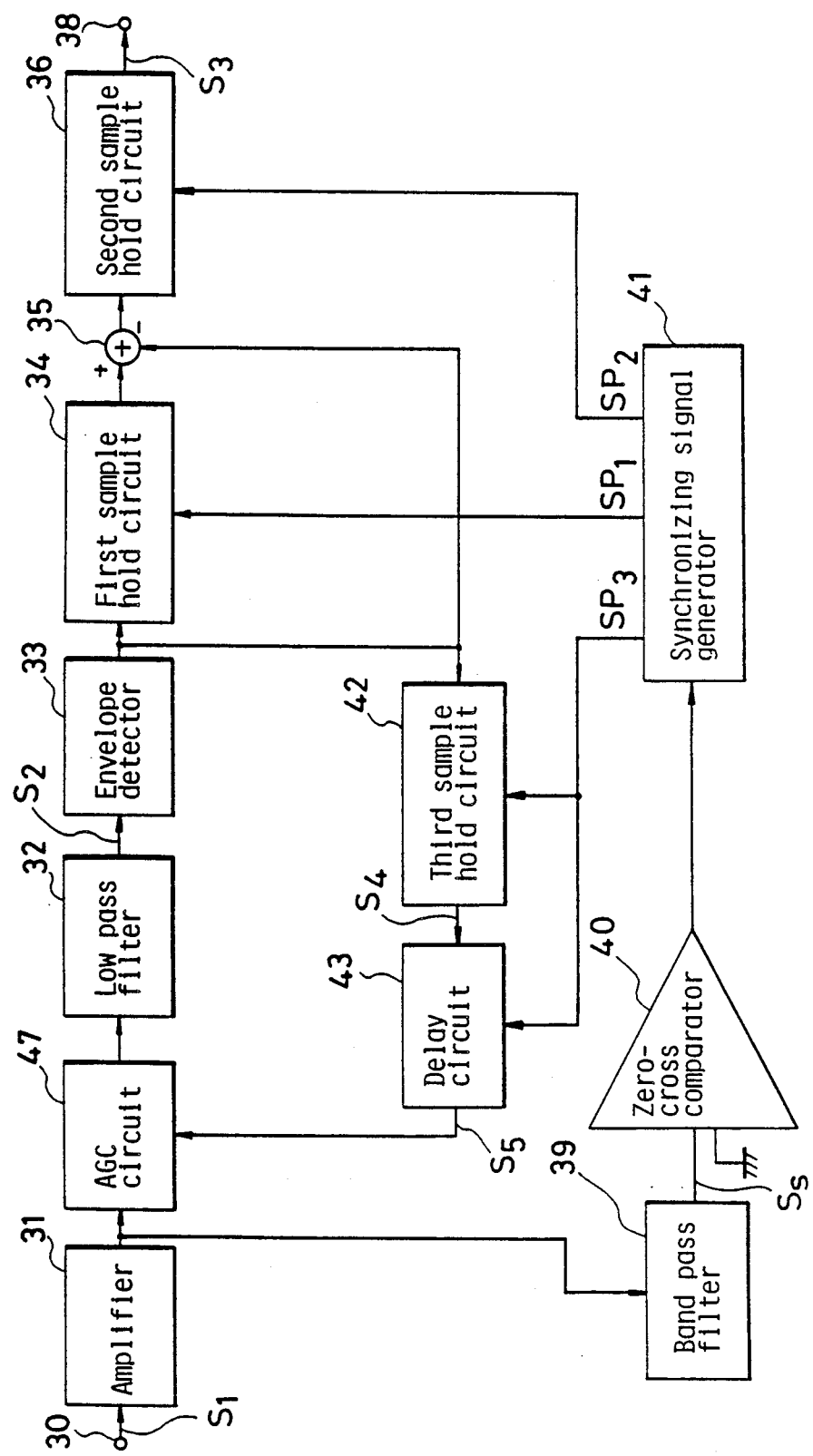
FIG. 7 is a circuit block diagram of a third embodiment of the tracking control circuit in accordance with the present invention.

FIG. 7 is a circuit block diagram of a third embodiment of the present invention. In the embodiment, an AGC circuit 47 is placed between the amplifier 31 and the low pass filter 32, and the output of the second sample hold circuit 36 is the tracking error signal. The output of the delay circuit 43 is applied to the AGC circuit 47, and remaining circuit is identical with that of the first embodiment.

Figure 8:
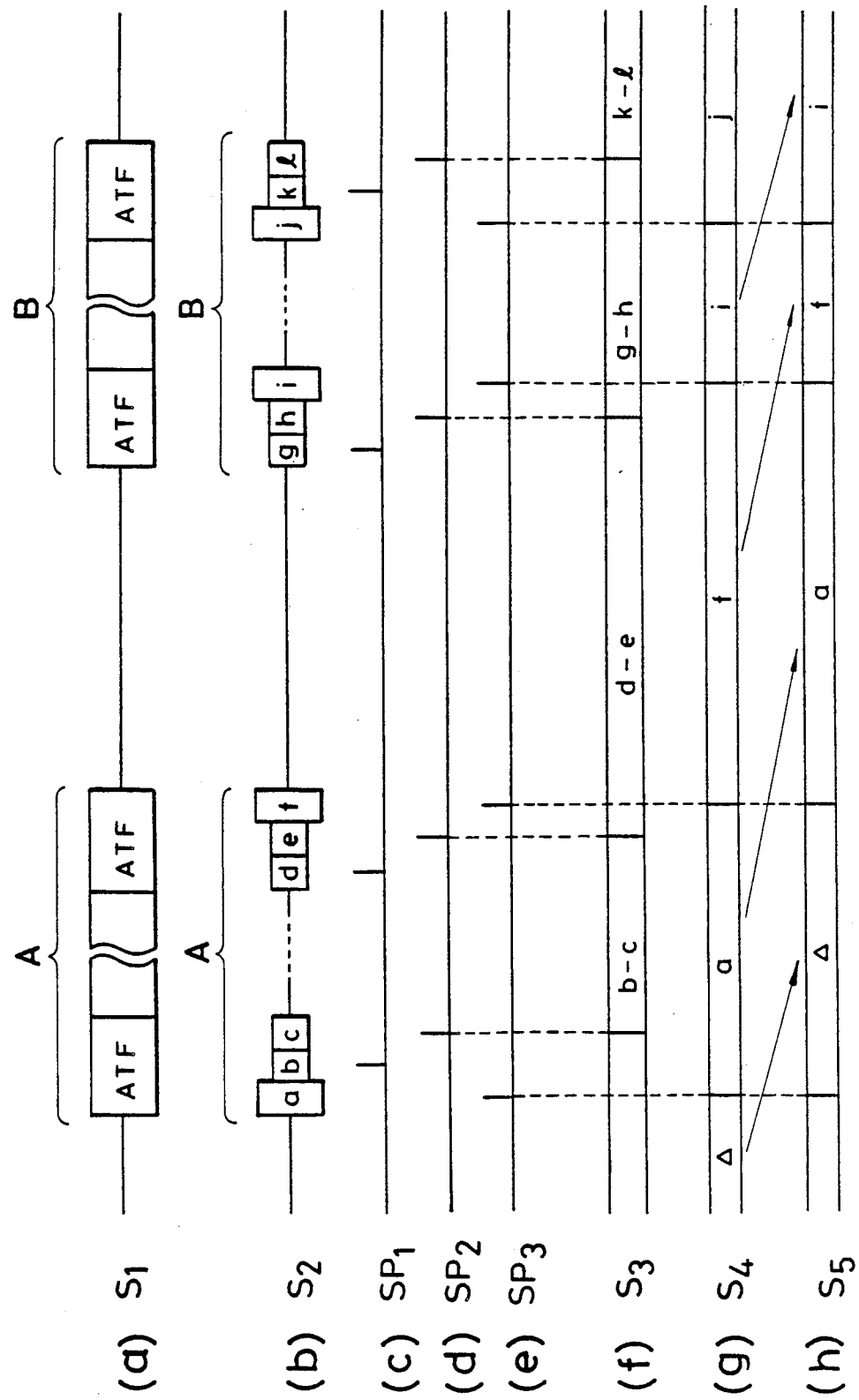
FIGS. 8($a$), 8($b$), 8($c$), 8($d$), 8($e$), 8($f$), 8($g$) and 8($h$) are timing charts in operation of the third embodiment.

In the embodiment, as shown in FIGS. 8(g) and 8(h), the signal $S_4$ based on a later pilot signal is delayed by the delay circuit 43, and a control signal $S_5$ is created. The control signal $S_5$ is applied to the AGC circuit 47 during reproduction of the subsequent track. According to the third embodiment, therefore, the signal $S_5$ controls the AGC circuit 47 in a direction to lessen a difference between the respective reproduced levels of neighboring two tracks.

Figure 9:
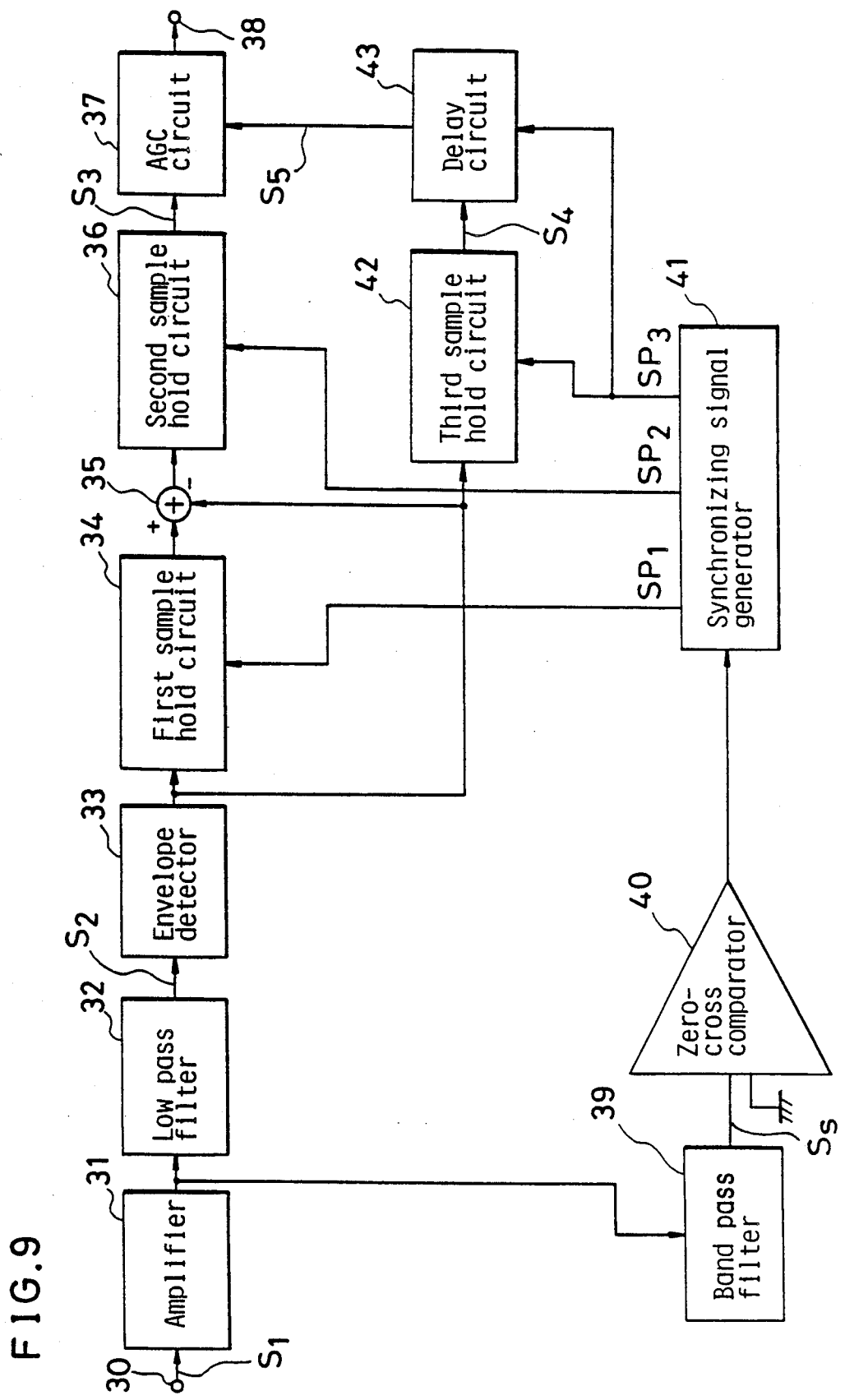
FIG. 9 is a circuit block diagram of a fourth embodiment of the tracking control circuit in accordance with the present invention.
Figure 15:
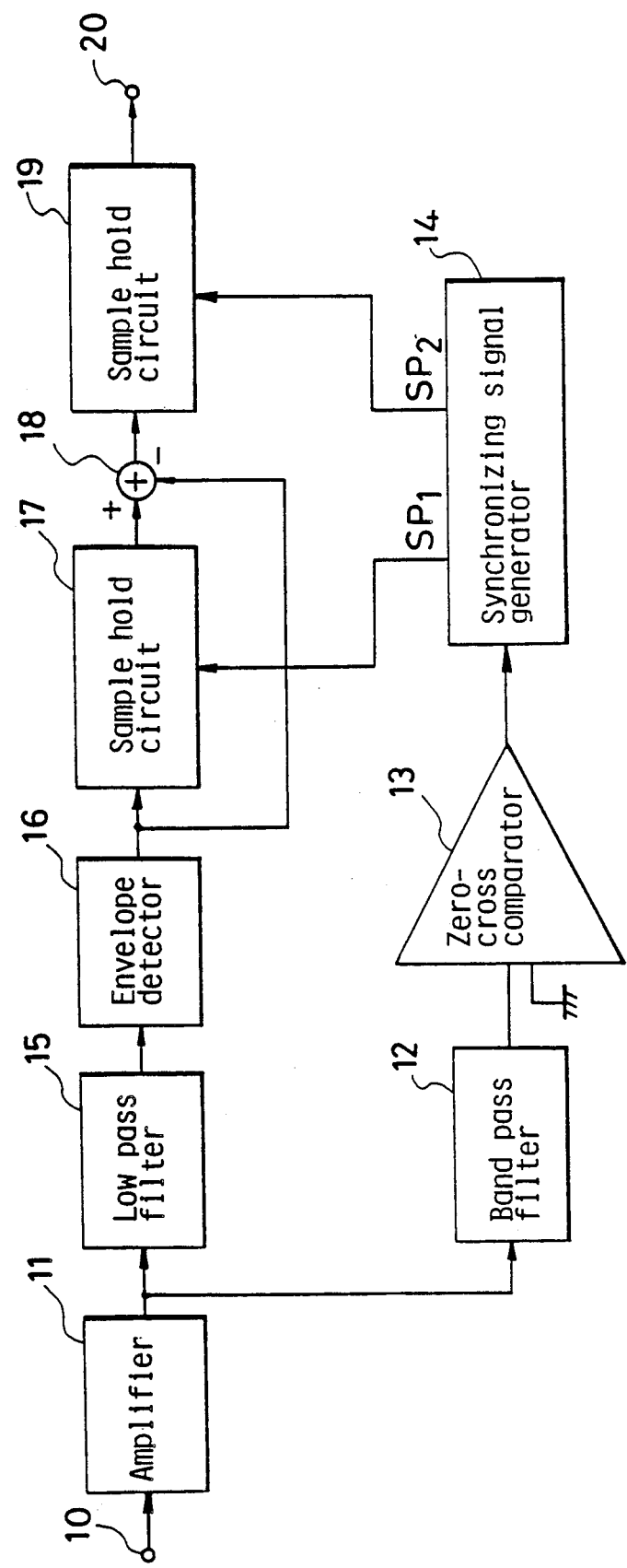
FIG. 15 is the circuit block diagram of the tracking control circuit in the prior art.
Figure 16:
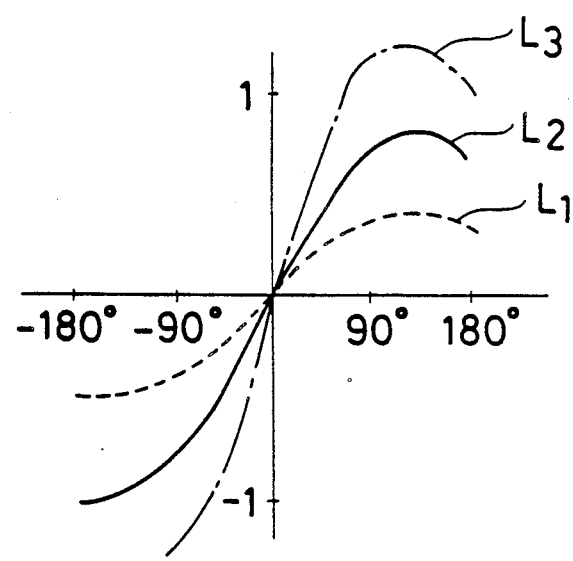
FIG. 16 is the graph of characteristic of level of tracking error signal in the prior art.
Figure 17:
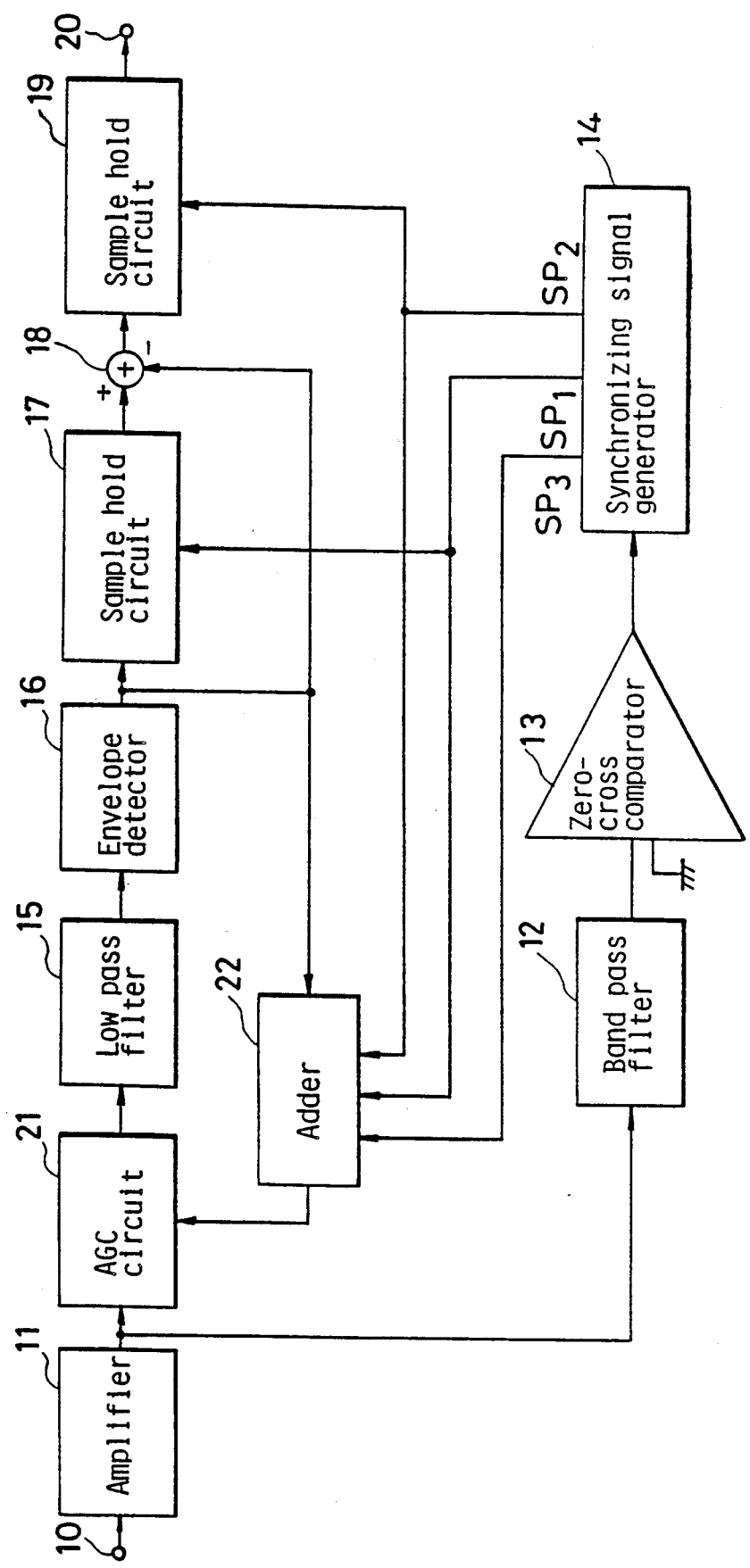
FIG. 17 is the other circuit block diagram of the tracking control circuit in the prior art.
Figure 19:
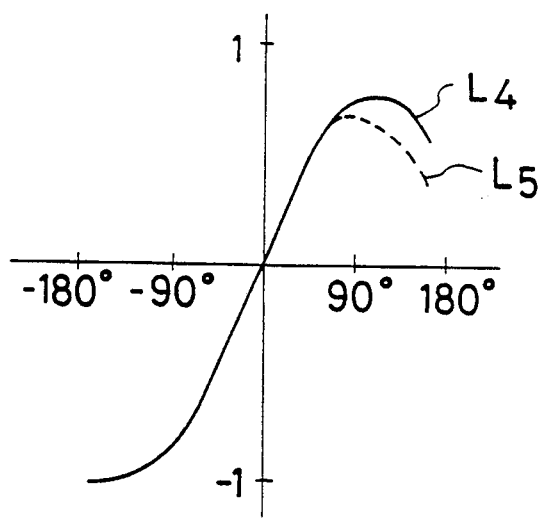
FIG. 19 and FIG. 20 are the graphs of characteristic of level of tracking error signal in the normal track mode and the wide track mode, respectively, in the prior art.
Figure 20:
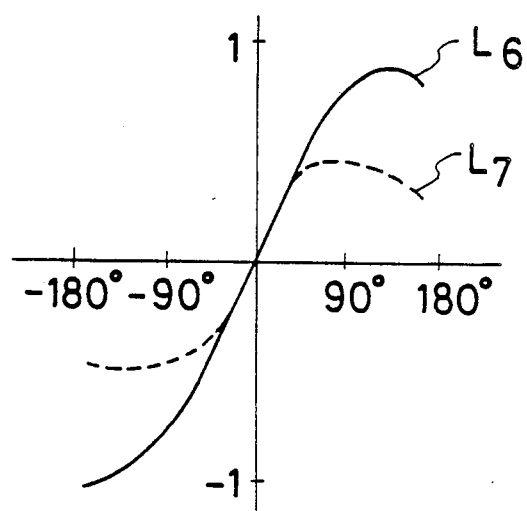

FIG. 9 is a circuit block diagram of a fourth embodiment of the present invention. In the fourth embodiment, in a manner similar to that illustrated in FIG. 1, the AGC circuit 37 receives the output of the second sample-hold circuit 36, and is controlled by the output of the delay circuit 43. Difference of the fourth embodiment with respect to he first embodiment shown by FIG. 1 is that the control signal $S_5$ is directly inputted to the AGC circuit 37 from the delay circuit 43. Furthermore, since a reproduced signal due to crosstalk of pilot signals of neighboring tracks is not included in the control signal $S_5$ which is applied to the AGC circuit, even if the level of the tracking error signal $S_3$ varies due to unstable contact between the head chip and the tape surface, serious variation of the level of the tracking error signal can be prevented.

In the fourth embodiment, in a similar manner of the third embodiment, since the tracking error signal created depending on crosstalk of pilot signals of the neighboring tracks is controlled by a reproduced signal of the own track of the head, a serious variation of the tracking error signal is prevented. Moreover, the third and fourth embodiment is simplified in configuration in comparison with the first or second embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A tracking control circuit of a helical scanning magnetic tape apparatus comprising:
   at least one magnetic head for reproducing recorded signals of a magnetic tape including pilot signals and a synchronizing signal,
   first filter means for passing the reproduced signal of said pilot signals,
   envelope detecting means for detecting envelope of said reproduced signal of said pilot signal passed through said first filter means,
   second filter means for passing the reproduced signal of said synchronizing signal,
   a synchronizing signal generator for creating timing signals on the basis of said reproduced signal of said synchronizing signal passed through said second filter means,
   calculating means for calculating a level of difference between the respective levels of said reproduced signals from crosstalk of respective pilot signals recorded on both neighboring tracks of a track,
   a sample-hold circuit for holding said level of difference in synchronism with said timing signal,
   a delay circuit for delaying the reproduced signal of the pilot signal of said track, and
   an automatic gain control circuit for controlling said level of difference on the basis of said delayed reproduced signal of the pilot signal of the previous track.

2. A tracking control circuit of a helical scanning magnetic tape apparatus comprising:
   two magnetic heads for reproducing recorded signals of a magnetic tape including pilot signals and a synchronizing signal,
   first filter means for passing the reproduced signal of said pilot signals reproduced by one magnetic head of said two magnetic heads,
   envelope detecting means for detecting envelope of the reproduced signal of said pilot signal,
   second filter means for passing the reproduced signal of said synchronizing signal reproduced by said one magnetic head,
   a synchronizing signal generator for creating timing signals on the basis of said reproduced signal of said synchronizing signal,
   a calculating means for calculating a level of difference between the respective levels of said reproduced signals from crosstalk of respective pilot signals recorded on both neighboring tracks of a track in synchronism with said timing signals,
   a sample-hold circuit for holding said level of difference between the respective levels of the two reproduced signals of said pilot signals in synchronism with said timing signal,
   a delay circuit for delaying said reproduced signal of said pilot signal of said track, and
   an automatic gain control circuit for controlling said level of said difference on the basis of said delayed reproduced signal of the pilot signal of the previous track reproduced by the other magnetic head.

3. A tracking control circuit of a herical scanning magnetic tape apparatus in accordance with claim 1 or 2, wherein
   said automatic gain control circuit controls said level of the difference between the respective levels of the reproduced signals from crosstalk of respective pilot signals recorded on both neighboring tracks of a track on the basis of a sum of levels of a sum of the respective levels of the reproduced signals from crosstalk of respective pilot signals recorded on both neighboring tracks of said track and a level of a reproduced signal of a pilot signal of the previous track.

4. A tracking control circuit of a herical scanning magnetic tape apparatus in accordance with claim 1, wherein
   said automatic gain control circuit controls said level of the difference between the respective levels of the reproduced signals from crosstalk of respective pilot signals recorded on both neighboring tracks of a track on the basis of a level of a reproduced signal of a pilot signal of the previous track.

* * * * *